United States Patent
Webster et al.

(10) Patent No.: US 10,964,322 B2
(45) Date of Patent: Mar. 30, 2021

(54) VOICE INTERACTION TOOL FOR VOICE-ASSISTED APPLICATION PROTOTYPES

(71) Applicant: Adobe Inc., San Jose, CA (US)

(72) Inventors: Mark C. Webster, New York, NY (US); Susse Soenderby Jensen, Brooklyn, NY (US); Scott Thomas Werner, Brooklyn, NY (US); Daniel Cameron Cundiff, Brooklyn, NY (US); Blake Allen Clayton Sawyer, Astoria, NY (US)

(73) Assignee: Adobe Inc., San Jose, CA (US)

( * ) Notice: Subject to any disclaimer, the term of this patent is extended or adjusted under 35 U.S.C. 154(b) by 57 days.

(21) Appl. No.: 16/255,481

(22) Filed: Jan. 23, 2019

(65) Prior Publication Data
US 2020/0234697 A1     Jul. 23, 2020

(51) Int. Cl.
| | | |
|---|---|---|
| G10L 15/22 | (2006.01) | |
| G10L 15/08 | (2006.01) | |
| G10L 15/30 | (2013.01) | |
| G10L 13/00 | (2006.01) | |

(52) U.S. Cl.
CPC .............. *G10L 15/22* (2013.01); *G10L 13/00* (2013.01); *G10L 15/08* (2013.01); *G10L 15/30* (2013.01); *G10L 2015/223* (2013.01)

(58) Field of Classification Search
None
See application file for complete search history.

(56) References Cited

U.S. PATENT DOCUMENTS

| | | |
|---|---|---|
| 6,360,237 B1 | 3/2002 | Schulz et al. |
| 6,738,964 B1 | 5/2004 | Zink et al. |
| 7,624,007 B2 * | 11/2009 | Bennett .................. G10L 15/22 704/9 |
| 8,086,995 B2 | 12/2011 | Luo et al. |

(Continued)

FOREIGN PATENT DOCUMENTS

WO    WO-2006110982    10/2006

OTHER PUBLICATIONS

"Pre-Interview First Office Action", U.S. Appl. No. 16/189,063, dated May 11, 2020, 3 pages.

(Continued)

*Primary Examiner* — Michael N Opsasnick
(74) *Attorney, Agent, or Firm* — FIG. 1 Patents

(57) ABSTRACT

A voice interaction tool for voice-assisted application prototypes is described. A visual page of an application prototype is displayed in a design interface. The design interface is controlled to provide an interaction interface to receive a trigger and an associated action for the visual page of the application prototype. The trigger may correspond to one of a voice command, a user gesture, or a time delay, and the action may correspond to one of a speech response, a page transition to an additional visual page of the application prototype, or playback of a media file. User input is received to provide the trigger and the action, and associated interaction data is generated to include the trigger, the action, and the visual page of the application prototype. The associated interaction data is stored to enable testing of the trigger and the action during a testing phase of the application prototype.

20 Claims, 11 Drawing Sheets

(56) References Cited

U.S. PATENT DOCUMENTS

| | | |
|---|---|---|
| 8,639,032 B1 | 1/2014 | Voorhees et al. |
| 9,172,738 B1 | 10/2015 | daCosta |
| 9,619,202 B1 | 4/2017 | Weingartner |
| 10,185,556 B2 | 1/2019 | Richstein et al. |
| 10,262,281 B1 | 4/2019 | Vitek et al. |
| 10,379,808 B1 | 8/2019 | Angel et al. |
| 10,423,303 B1 | 9/2019 | Roach et al. |
| 10,531,157 B1 | 1/2020 | Loritsch et al. |
| 10,847,156 B2 | 11/2020 | Webster et al. |
| 10,908,883 B2 | 2/2021 | Webster et al. |
| 2004/0015841 A1 | 1/2004 | Lepejian et al. |
| 2004/0027379 A1 | 2/2004 | Hong Huey et al. |
| 2004/0061722 A1 | 4/2004 | Christopher et al. |
| 2005/0091057 A1* | 4/2005 | Phillips .................. G10L 15/30 704/270.1 |
| 2006/0235699 A1* | 10/2006 | Dhanakshirur ......... G10L 15/22 704/275 |
| 2006/0247912 A1 | 11/2006 | Suzuki et al. |
| 2008/0154590 A1* | 6/2008 | Doyle .................... G10L 15/22 704/231 |
| 2008/0255845 A1* | 10/2008 | Bennett .................... G09B 7/02 704/257 |
| 2008/0276159 A1 | 11/2008 | Narayanaswami et al. |
| 2008/0304632 A1* | 12/2008 | Catlin ................. H04M 3/4938 379/88.04 |
| 2008/0319762 A1 | 12/2008 | Da Palma et al. |
| 2009/0141871 A1 | 6/2009 | Horioka et al. |
| 2011/0022393 A1 | 1/2011 | Waller et al. |
| 2011/0060587 A1 | 3/2011 | Phillips et al. |
| 2011/0161347 A1* | 6/2011 | Johnston ................. G06F 16/84 707/769 |
| 2011/0202562 A1 | 8/2011 | Bloch et al. |
| 2011/0320468 A1 | 12/2011 | Child |
| 2012/0010876 A1* | 1/2012 | Smolenski .............. G10L 15/26 704/9 |
| 2012/0081371 A1 | 4/2012 | Ozkaragoz et al. |
| 2012/0221998 A1 | 8/2012 | Rowley et al. |
| 2013/0179173 A1 | 7/2013 | Lee et al. |
| 2013/0317921 A1 | 11/2013 | Havas |
| 2014/0244712 A1 | 8/2014 | Walters et al. |
| 2014/0297282 A1 | 10/2014 | Peters et al. |
| 2014/0310004 A1* | 10/2014 | Zhang .................... G10L 15/22 704/275 |
| 2014/0372892 A1 | 12/2014 | Payzer et al. |
| 2014/0379335 A1 | 12/2014 | Han et al. |
| 2015/0154958 A1 | 6/2015 | Hu et al. |
| 2015/0348551 A1 | 12/2015 | Gruber et al. |
| 2015/0350443 A1 | 12/2015 | Kumar et al. |
| 2015/0370780 A1 | 12/2015 | Wang et al. |
| 2016/0026608 A1* | 1/2016 | Curin ..................... G10L 15/22 715/230 |
| 2016/0307439 A1 | 10/2016 | Selfe et al. |
| 2016/0307575 A1 | 10/2016 | Cha et al. |
| 2017/0018041 A1 | 1/2017 | Fox |
| 2017/0060348 A1 | 3/2017 | Kongot |
| 2017/0140449 A1 | 5/2017 | Kannan |
| 2017/0162198 A1 | 6/2017 | Chakladar |
| 2017/0199870 A1 | 7/2017 | Zheng et al. |
| 2017/0236512 A1 | 8/2017 | Williams et al. |
| 2017/0308361 A1 | 10/2017 | Brezinsky et al. |
| 2018/0047391 A1 | 2/2018 | Baik et al. |
| 2018/0061420 A1 | 3/2018 | Patil et al. |
| 2018/0108351 A1 | 4/2018 | Beckhardt et al. |
| 2018/0204569 A1 | 7/2018 | Nadkar et al. |
| 2019/0004791 A1* | 1/2019 | Brebner .................. G06F 8/315 |
| 2019/0005957 A1 | 1/2019 | Yoon |
| 2019/0012625 A1 | 1/2019 | Lawrenson et al. |
| 2019/0066669 A1 | 2/2019 | Sabur et al. |
| 2019/0080698 A1 | 3/2019 | Miller |
| 2019/0082043 A1 | 3/2019 | Lavian et al. |
| 2019/0166069 A1 | 5/2019 | Yao et al. |
| 2019/0259386 A1 | 8/2019 | Kudurshian et al. |
| 2020/0004874 A1 | 1/2020 | Gupta et al. |
| 2020/0007680 A1 | 1/2020 | Wozniak |
| 2020/0034492 A1 | 1/2020 | Verbeke et al. |
| 2020/0125475 A1 | 4/2020 | Iyer et al. |
| 2020/0143820 A1 | 5/2020 | Donofrio et al. |
| 2020/0150934 A1 | 5/2020 | Webster et al. |
| 2020/0168217 A1 | 5/2020 | Webster et al. |
| 2020/0234699 A1 | 7/2020 | Webster et al. |

OTHER PUBLICATIONS

"First Action Interview Office Action", U.S. Appl. No. 16/189,063, dated Jun. 5, 2020, 3 pages.

"Notice of Allowance", U.S. Appl. No. 16/203,526, dated Jul. 13, 2020, 8 pages.

"Final Office Action", U.S. Appl. No. 16/189,063, dated Jun. 19, 2020, 9 pages.

"Voicegram by Sayspring", Retrieved at: https://www.producthunt.com/posts/voicegram-by-sayspring—on Dec. 5, 2019, 5 pages.

Webster,"Introducing Voicegram by Sayspring", Retrieved at: https://medium.com/vui-magazine/introducing-voicegram-by-sayspring-23273aa01af0, Feb. 6, 2018, 4 pages.

"Notice of Allowance", U.S. Appl. No. 16/420,829, dated Jan. 15, 2021, 10 pages.

"Corrected Notice of Allowability", U.S. Appl. No. 16/203,526, dated Aug. 24, 2020, 2 pages.

"Corrected Notice of Allowability", U.S. Appl. No. 16/203,526, dated Oct. 28, 2020, 2 pages.

"Corrected Notice of Allowability", U.S. Appl. No. 16/203,526, Sep. 8, 2020, 3 pages.

"Non-Final Office Action", U.S. Appl. No. 16/189,063, dated Sep. 4, 2020, 10 pages.

"Notice of Allowance", U.S. Appl. No. 16/189,063, dated Oct. 23, 2020, 12 pages.

\* cited by examiner

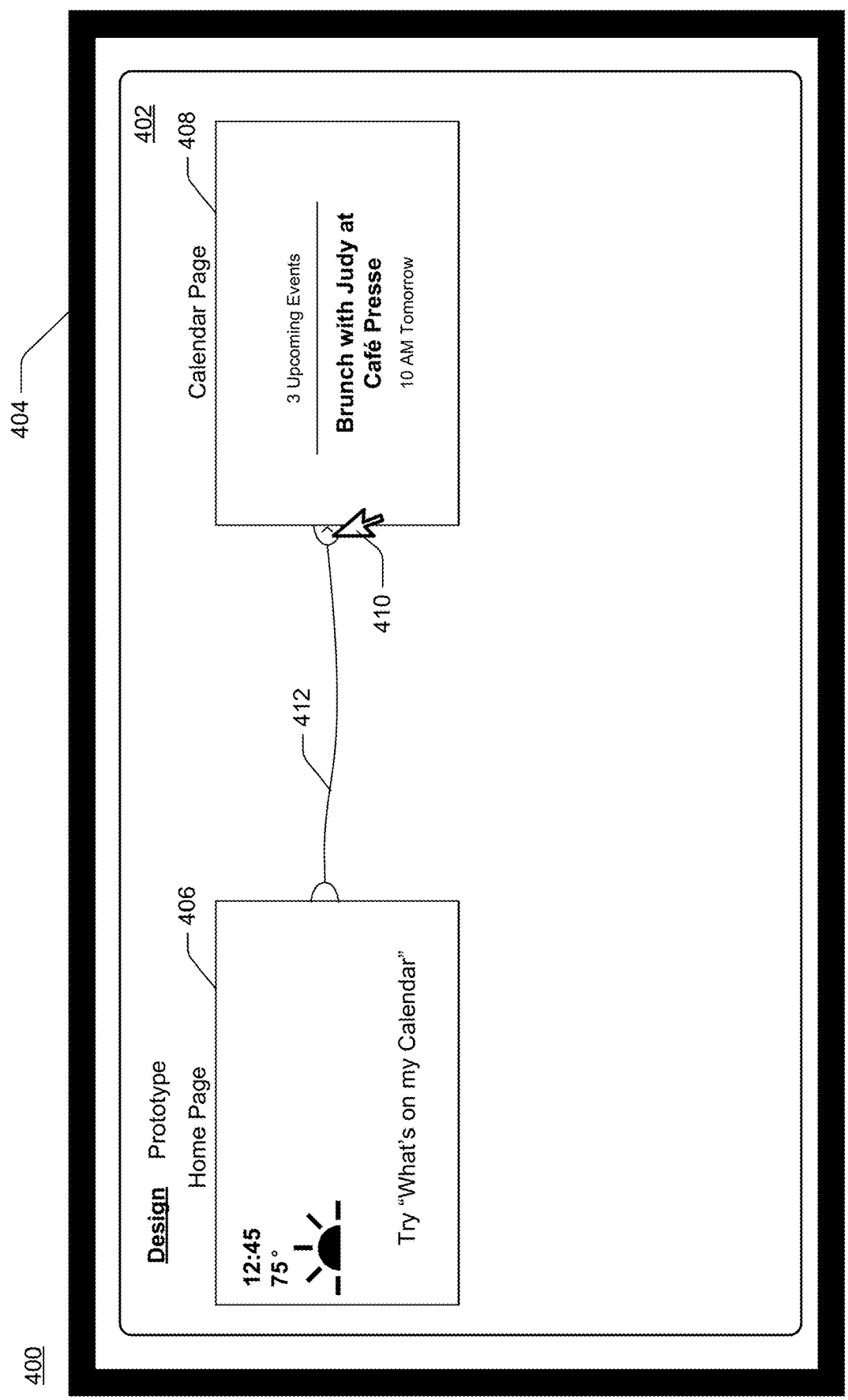

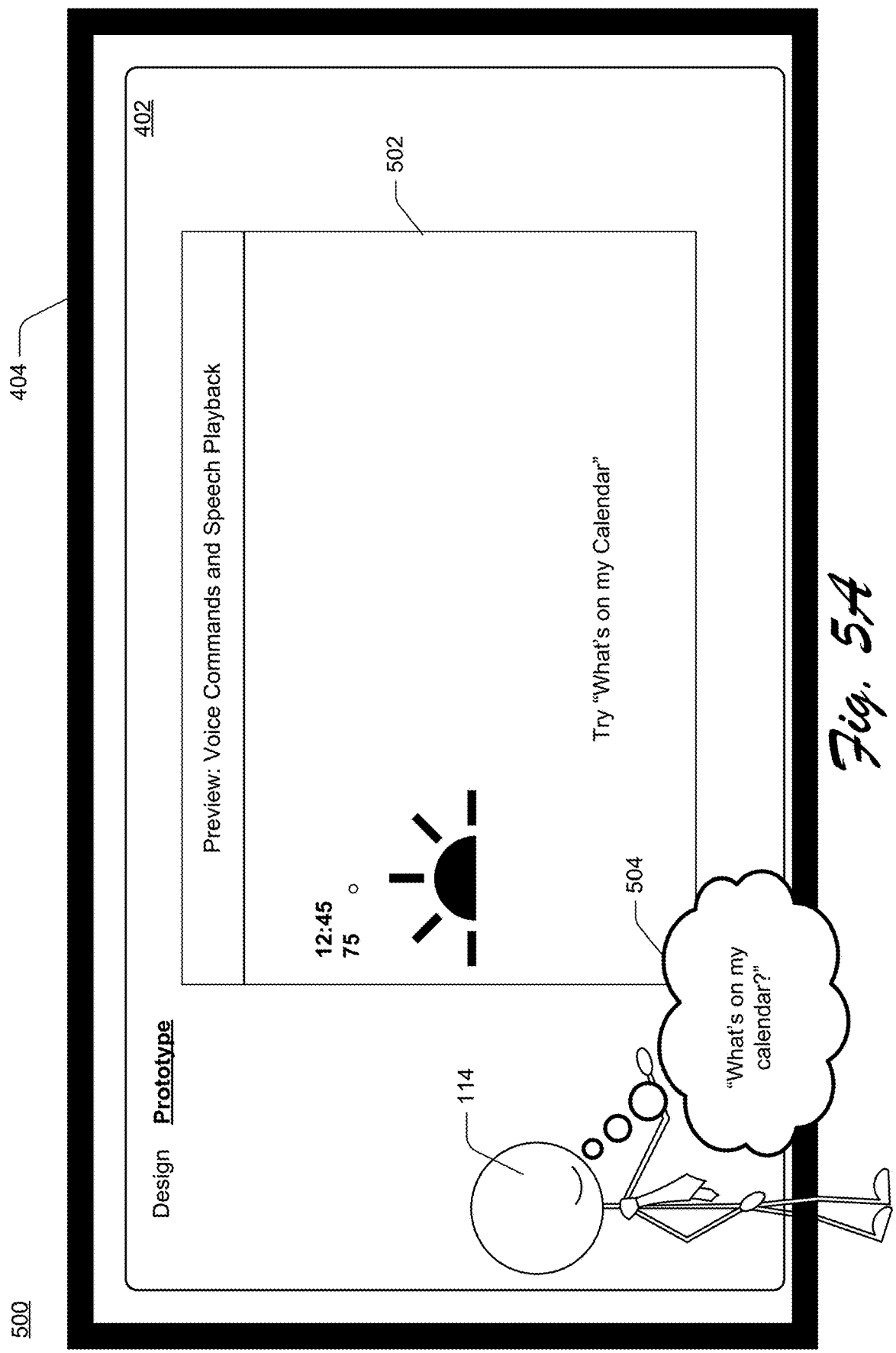

VOICE INTERACTION TOOL FOR VOICE-ASSISTED APPLICATION PROTOTYPES

BACKGROUND

Users are interacting with voice assistant devices to accomplish an increasing number of different voice-assisted tasks. Generally speaking, such voice assistant devices are configured with one or more microphones to receive voice commands from a user. Examples of dedicated voice assistant device include the Amazon® Echo and Google® Home, which enable interactions with voice assistant platforms Amazon® Alexa and Google® Assistant, respectively. However, other devices, such as mobile phones, desktop computers, laptop computers, gaming systems, and so forth may also be configured as voice assistant devices capable of leveraging the functionality of a voice assistant platform. By way of example, an Apple® iPhone (a mobile phone) may serve as a voice assistant device, enabling a user to interact with the voice assistant platform Siri®.

Such voice assistant devices are configured to respond to the user's voice commands in a variety of different ways, such as by outputting an audible (voice) response via one or more speakers, displaying visual content, providing other visual effects (e.g., indications via light emitting diodes (LEDs)), providing tactile feedback, and so forth. Moreover, the voice assistant platform may cause other devices, e.g., a thermostat, speakers, lights, and so on, to respond to the user's voice command. A few examples of responses for home appliances include changing a temperature of a thermostat to adjust a house's temperature, beginning to play music from a music service over speakers, turning certain lights in the house on or off, and so forth.

As voice interaction becomes more prevalent, designers are beginning to add voice interaction functionality to digital interfaces, such as by adding voice functionality to visual pages of an application or webpage user interface. However, conventional design applications fail to support the design and testing of voice functionality for application prototypes. As such, it is difficult to design and voice-assisted test application prototypes.

SUMMARY

To overcome these problems, a voice interaction tool for voice-assisted application prototypes is leveraged in a digital medium environment. A design application provides a design interface which enables a user to design an application prototype for an application. Generally, the application prototype includes a sequence of visual pages, as well as various triggers and corresponding actions associated with the visual pages. To enable the design of the application prototype, at least one visual page of the application prototype is displayed in the design interface. The design interface is controlled to provide an interaction interface to receive a trigger and an associated action for the at least one visual page of the application prototype. The trigger may correspond to one of a voice command, a user gesture, or a time delay, and the action may correspond to one of a speech response, a page transition to an additional visual page of the application prototype, or playback of a media file. User input is received, via the design interface, to provide the trigger and the action. In response to the user input, associated interaction data is generated to include the trigger, the action, and the visual page of the application prototype. The associated interaction data is stored to enable testing of the trigger and the action during a testing phase of the application prototype.

In the testing phase, at least one visual page of the application prototype is displayed, and a trigger is detected. The trigger may correspond to a voice command received from a user, a user gesture, or expiration of a time delay, to name just a few. The trigger is compared to the stored triggers associated with the application prototype to identify a matching trigger. If the trigger corresponds to a voice command, then the voice command is provided to a voice-to-text service that converts the voice command into a text string in real-time. The text string of the voice command is then compared to stored text strings of voice commands associated with the application prototype to identify a matching voice command.

Responsive to identifying the matching trigger, an action associated with the matching trigger is performed during the testing phase. The action may correspond to a speech response, a page transition to a different visual page, or playback of a media file. If the action corresponds to a speech response, then a text string of the speech response may be provided to a text-to-voice service that converts the speech response into an audio file in real-time. The speech response is then output by playing back the audio file.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures.

FIGS. 4A-4C depict an example of a design interface of a design application used to design a voice-assisted application prototype.

FIGS. 5A and 5B depict an example of a design interface of a design application during a testing phase of a voice-assisted application prototype.

DETAILED DESCRIPTION

Overview

Figure 1:
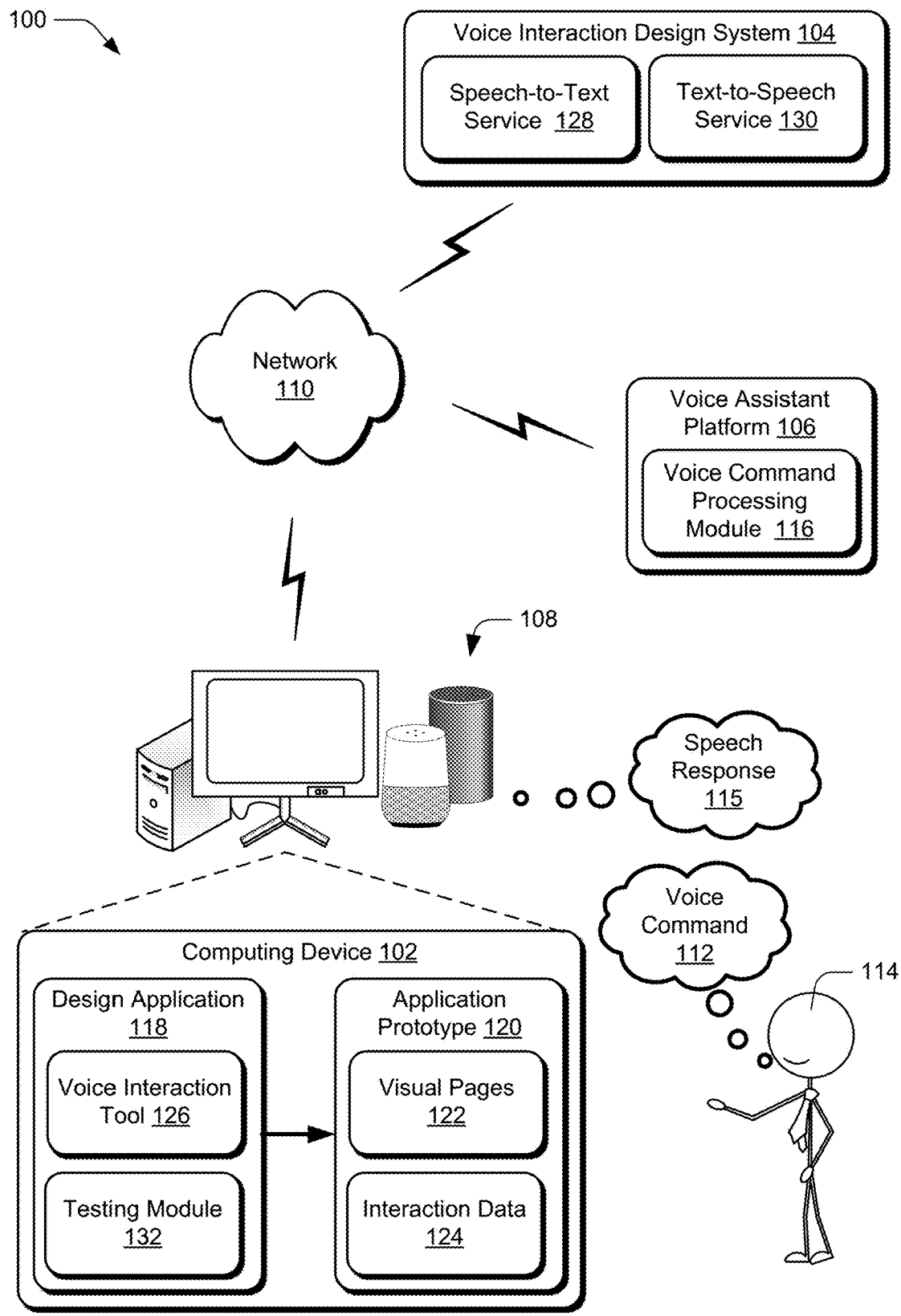
FIG. 1 is an illustration of an environment in an example implementation that is operable to employ a voice interaction tool for voice-assisted application prototypes described herein.

Users are interacting with voice assistant devices to accomplish an increasing number of different voice-assisted tasks. In order to accomplish these tasks via voice-assisted interaction, the functionality to do so must be enabled by the design, development, and deployment of a software application, firmware, service, plug-in, script, and so forth. However, conventional tools for designing application prototypes limit the ability of users to design and test voice-assisted functionality for application prototypes.

To overcome these problems, a voice interaction tool for voice-assisted application prototypes is leveraged in a digital medium environment. A design application, such as Adobe® XD, provides a design interface which enables a user (e.g., a designer) to design an application prototype for an application. Generally, the application prototype includes visual pages of the application, as well as various triggers and corresponding actions associated with the visual pages. The visual pages may correspond to different pages or "screens" of the application prototype. As part of the design of visual pages, the design application provides tools and functionalities to enable the design and layout of user interface controls, graphics, and text for the application prototype. For instance, a design interface enables the design of a sequence of visual pages of the application prototype (e.g., a home screen page as well as various other visual pages) which can be navigated to during interaction with the application prototype.

To enable the design of a functioning application prototype, a voice interaction tool of the design application enables integration of both voice commands and speech playback directly into the design of the application prototype. To do so, the voice interaction tool controls the design interface to provide an interaction interface that includes a control for providing a trigger and an associated action for a visual page of the application prototype. As described herein, the term "trigger" refers to a command that can trigger a corresponding action, while an "action" is an operation that is performed in response to detection of the corresponding trigger. Examples of triggers include, by way of example and not limitation, voice commands, user gestures (e.g., taps, drags, swipes, keystrokes), and time delays. Examples of actions include, by way of example and not limitation, speech responses, page transitions to other visual pages of the application prototype, and playback of media files (e.g., an audio or video file).

The interaction interface enables the user to select the trigger and associated action from a list of defined triggers and actions. Once selected, the user provides input describing the selected trigger and action. For example, to associate a voice command with a particular visual page of the application prototype, the voice interaction tool may enable the user to select the particular visual page (e.g., using touch functionality) and specify different voice commands or speech responses that correspond to the particular element via the interaction interface (e.g., by typing the commands or responses, speaking the commands or responses into a microphone or a communicably coupled device, and so on). The voice commands may be configured as audio data or text data indicative of speech of a user to a voice-assisted application. The speech response represents the audible output of the voice-assisted application (e.g., by a voice assistant) in response to receipt of the voice command.

Notably, the interaction interface enables the user to associate various different types of triggers and actions with visual pages of the application prototype. For example, the user can associate voice command triggers with corresponding speech responses. However, the design application enables the user to mix and match voice interactions with other triggers and actions, such as by associating a user gesture trigger with a speech response, or by associating a voice command with a transition to a different visual page of the application prototype. In response to a voice command such as "what's the weather," for instance, the application may transition to a visual page that presents a summary of upcoming weather.

The design application then associates the interaction data of the trigger and the action with the corresponding visual page. Doing so enables the interaction data associated with the respective visual pages to be retrieved based on identification of the trigger during a testing phase of the application prototype. In some cases, the interaction data and the associated visual pages may be stored locally at the client device. For instance, the voice interaction tool may generate a file for the application prototype that includes the interaction data and the associated visual pages and cause the file to be stored in storage of the client device. In this way, the file can be easily transferred to other designers who can continue the design. Alternately or additionally, the interaction data and the associated visual pages may be maintained in a remote storage.

The design application is further implemented with a testing module to enable testing of the voice-assisted application prototype created using the design application. When the testing phase is initiated, the testing module displays a first visual page (e.g., the home page) of the application prototype. In real-time, as the user interacts with the application prototype, such as by speaking a voice command or tapping on the visual page, the testing module causes the corresponding actions associated with the triggers to be performed, such as by outputting a speech response, transitioning to a different visual page, initiating playback of media content, or some combination thereof. In this way, the described system enables the user to interact with the application prototype during the testing phase to ensure that the application prototype will function as intended. Doing so enables the designer to identify and improve any problems with the design of voice-assisted interactions before the development stage. After the application prototype has been designed and tested, the design application may generate a design specification containing instructions and data which may be utilized by an application developer to develop the application in accordance with the design of the application prototype. Alternately, the design application may be implemented to generate an executable application at the conclusion of the design and testing process.

Thus, the described techniques simplify the design of voice-assisted application prototypes by enabling the effortless integration of both voice commands and speech playback directly into application prototype designs, while the testing phase enables the user to provide voice commands and outputs speech playback to enable the user to simulate interaction with the application prototype.

In the following discussion, an example environment is first described that may employ the techniques described herein. Example implementation details and procedures are then described which may be performed in the example environment as well as other environments. Consequently, performance of the example procedures is not limited to the example environment and the example environment is not limited to performance of the example procedures.

Example Environment

FIG. 1 is an illustration of an environment 100 in an example implementation that is operable to employ a voice interaction tool for voice-assisted application prototypes described herein. The illustrated environment 100 includes computing device 102, voice interaction design system 104, and a voice assistant platform 106, and various voice assistant devices 108 that are communicatively coupled, one to another, via a network 110.

Devices that are usable to implement the computing device 102, voice interaction design system 104, and voice assistant platform 106 may be configured in a variety of ways. These devices, for instance, may be configured as a desktop computer, a laptop computer, a mobile device (e.g., assuming a handheld configuration such as a tablet or mobile phone), and so forth. Thus, the device may range from full resource devices with substantial memory and processor resources (e.g., personal computers, game consoles) to a low-resource device with limited memory and/or processing resources (e.g., mobile devices). Additionally, a device may be representative of a plurality of different devices, such as multiple servers utilized by a business to perform operations "over the cloud" as further described in relation to FIG. 8.

The voice assistant devices 108 may also be configured in a variety of ways. Generally speaking, the voice assistant devices 108 are configured with one or more microphones to receive voice commands 112 from a user 114. Examples of dedicated voice assistant device 108 include the Amazon® Echo and Google® Home, which enable interactions with voice assistant platforms Amazon® Alexa and Google® Assistant, respectively. Other devices, such as mobile phones, desktop computers, laptop computers, gaming systems, and so forth may also be configured as voice assistant devices 108 capable of leveraging the functionality of a voice assistant platform. By way of example, an Apple® iPhone (a mobile phone) may serve as a voice assistant device 108, enabling a user 114 to interact with the voice assistant platform Siri®. To this end, the voice assistant devices 108 can be configured to receive user input through interfaces (e.g., touch, camera, etc.) in addition to receiving voice commands 112.

In any case, these voice assistant devices 108 interact with their respective voice assistant platform 106 to respond to the voice commands 112. The voice assistant platform 106 is illustrated having voice command processing module 116. The voice command processing module 116 represents functionality to receive a request initiated by the voice command 112, determine how to respond to the request, and provide a response to the voice assistant device 108 or any other devices that may be affected by the voice command 112, such as appliances within a connected home, service provider devices providing one or more respective services (e.g., facilitating delivery of goods by an e-commerce platform), and so on. Accordingly, the voice assistant devices 108 may be configured to respond to the user 114's voice commands in myriad ways, such as by outputting an audible speech response 115 via one or more speakers, displaying visual content, providing other visual effects (e.g., indications via light emitting diodes (LEDs)), providing tactile feedback, and so forth. Moreover, the voice assistant platform 106 may cause other devices, e.g., a thermostat, speakers, lights, and so on, to respond to the user 114's voice command 112. A few examples of responses for home appliances include changing a temperature of a thermostat to adjust a house's temperature, beginning to play music from a music service over speakers, turning certain lights in the house on or off, and so forth. The voice commands 112 may be leveraged in a variety of settings (e.g., home, work, etc.) to initiate responses via one or more devices, including, but not limited to the voice assistant device 108.

In the context of the illustrated environment 100, a design application 118 represents functionality to enable a user of the computing device 102 (e.g., a designer) to design an application prototype 120 for an application, such as a software application, firmware, services, plug-ins, scripts, and so on. In some cases, the application prototypes 120 are designed for a voice assistant platform 106, such as an Amazon® Show with includes an integrated display screen. However, the application prototypes 120 may be designed for any type of application which includes voice-assisted functionality. Design application 118 may be implemented as a design application, such as Adobe® XD or Adobe® Sketch. However, design application 118 may be implemented as a variety of different third-party content creation or editing applications, voice application development applications, development environments, and so forth.

The design application 118 provides various interfaces and controls which enable the user to design a sequence of visual pages 122 of the application prototype 120. As part of the design of visual pages 122, the design application 118 provides tools to design and layout various user interface controls (e.g., selectable buttons and drop down lists), graphics, text, and so forth for the application prototype 120. For instance, the user may design a home page for an application, as well as other visual pages 122 which may be navigated to by an end user.

In accordance with the described techniques, the design application 118 further includes a voice interaction tool 126, which facilitates associating interaction data 124 in the form of voice commands and speech responses with different visual pages 122 of the application prototype 120. To do so, the voice interaction tool 126 controls a design interface of the design application 118 to provide an interaction interface to receive a trigger and an associated action for a visual page 122 of the application prototype 120. As described herein, triggers include various user commands that can trigger a corresponding action. Examples of triggers include voice commands, user gestures (e.g., taps, drags, swipes, keystrokes), and time delays, to name just a few. Examples of actions include speech responses, transitions to other visual pages of the application prototype, and playback of media files (e.g., a video file), to name just a few.

In some cases, the interaction interface enables the user to select the trigger and associated action from a list of defined triggers and actions. Once selected, the user provides input describing the selected trigger and action. For example, to associate a voice command with a particular visual page 122 of the application prototype 120, the voice interaction tool 126 may enable the user to select the particular visual page 122 (e.g., using touch functionality) and specify different voice commands or speech responses that correspond to the particular visual page via the interaction interface (e.g., by typing the commands or responses, speaking the commands or responses into a microphone or a communicably coupled device, and so on). As used herein, the interaction data 124 includes voice commands and speech responses, as well as other types of triggers (e.g., user gestures and time delays) and actions (e.g., page transitions and media playback).

Notably, the design application 118 enables the user to associate various different types of triggers and actions with visual pages 122 of the application prototype 120. For example, the user can associate voice command triggers with corresponding speech responses. However, the design application 118 enables the user to mix and match voice interactions with other triggers and actions, such as by associating a user gesture trigger with a speech response, or by associating a voice command with a transition to a different visual page 122 of the application prototype 120.

As part of facilitating the design of voice-assisted interactions for the application prototype 120, the voice interaction tool 126 may leverage functionality of the voice interaction design system 104. In the illustrated environment 100, the voice interaction design system 104 is depicted with a speech-to-text service 128 and a text-to-speech service 130. Generally, the speech-to-text service 128 is representative of functionality to identify spoken words and phrases in the voice data captured by the one or more microphones and convert the spoken words and phrases into a text string. The text-to-speech service 130 is representative of functionality to process textual data (e.g., textual data received via user input to a user interface of the design application) into a speech response. Thus, the speech-to-text service 128 and the text-to-speech service 130 enable the user to provide both audible and textual input to the design application 118 during the design and testing of the application prototype 120. Although illustrated with these particular components, it should be appreciated that the voice interaction design system 104 may include or have access to (e.g., via a cloud-computing service) more, fewer, and different components to provide the functionality described herein without departing from the spirit or scope thereof. In addition, in some cases, the speech-to-text service 128 or the text-to-speech service 130 may be implemented at computing device 102 or may be implemented at separate third-party servers. When the speech-to-text service 128 and the text-to-speech service 130 are implemented as third-party services, the voice interaction tool 126 can utilize authorization tokens to establish secure communication channels to the speech-to-text service 128 and the text-to-speech service 130.

The design application 118 is further implemented with a testing module 132 to enable enabling testing of the voice-assisted application prototype 120 created using the design application 118. To do so, the testing module 132 displays a first visual page (e.g., the home page) of the application prototype 120 in a testing phase. In real-time, as a user interacts with the application prototype 120, such as by speaking a voice command or tapping on the visual page 122, the testing module 132 causes the corresponding actions associated with the triggers to be performed, such as by outputting a speech response, transitioning to a different visual page, initiating media playback, or some combination thereof. In this way, the described system enables the user to interact with the application prototype 120 during the testing phase to ensure that the application prototype will function as intended. Doing so enables the user to identify and improve any problems with the design of voice-assisted interactions before the development stage.

After the application prototype 120 has been designed and tested, the design application 118 may generate a design specification which may be provided to an application developer to develop the application. Alternately, the design application 118 may be implemented to generate an executable application at the conclusion of the design and testing process. By enabling voice interactions for application prototyping, the described techniques enable designers to design voice-assisted applications which include visual interfaces.

Having considered an example environment, consider now a discussion of some example details of the techniques for a voice interaction tool for voice-assisted application prototypes in a digital medium environment in accordance with one or more implementations.

Figure 2:
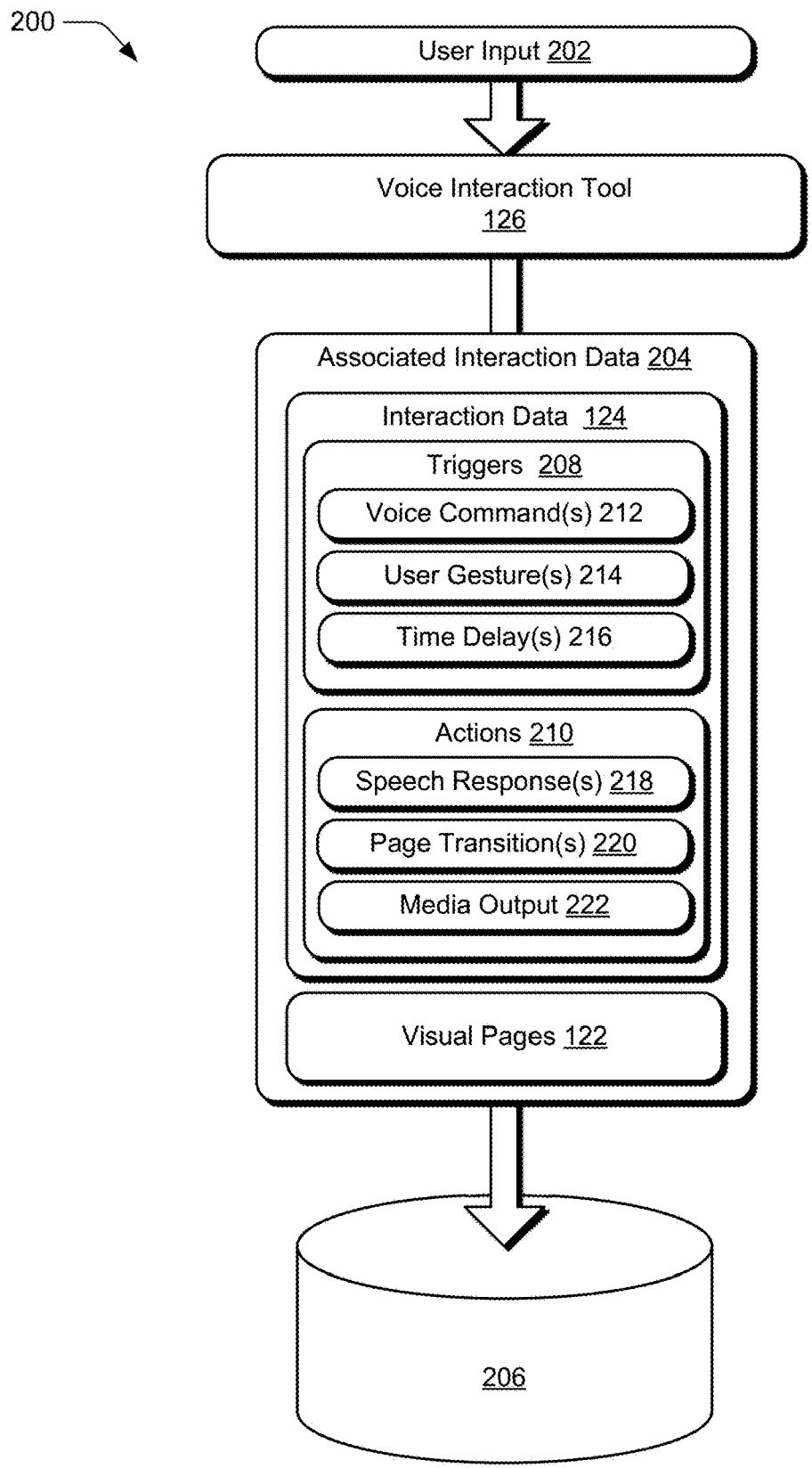
FIG. 2 depicts an example implementation in which a voice interaction tool of FIG. 1 generates associations between interaction data and visual pages of an application prototype and maintains the interaction data and visual pages.

FIG. 2 depicts an example implementation 200 in which a voice interaction tool of FIG. 1 generates associations between interaction data and visual pages of an application prototype and maintains the interaction data and visual pages. The illustrated example 200 includes from FIG. 1 the voice interaction tool 126 of the design application 118.

In example 200, the voice interaction tool 126 is depicted obtaining user input 202. The user input 202 may be received by the voice interaction tool 126 via a user interface of the design application 118, such as a user interface similar to the ones discussed in relation to FIGS. 4 and 5. In some cases, the user input 202 may correspond to voice input that is captured by one or more microphones. Broadly speaking, the user input identifies a trigger and a corresponding action associated with a visual page 122 of the application prototype 120. As described throughout, triggers include various user commands that can trigger a corresponding action.

Based on the user input 202, the voice interaction tool 126 generates associated interaction data 204, which describes the association between the interaction data 124 (e.g., triggers and actions) and respective visual pages 122. This associated interaction data 204 may be maintained by the design application 118, such that the interaction data 124 associated with the respective visual page 122 can be retrieved from a storage 206 based on detection of the trigger.

The storage 206 may be implemented locally at the computing device 102. For instance, the voice interaction tool may generate a file for the application prototype 120 that includes the interaction data 124 and the associated visual pages 122 and cause the file to be stored in the storage 206 of the computing device 102. Doing so enables the interaction data 124 associated with the respective visual pages 122 to be retrieved from the storage based on identification of the trigger during a testing phase of the application prototype 120. Alternately or additionally, the interaction data 124 and the associated visual pages 122 may be maintained in a remote storage of the voice interaction design system 104. In one or more implementations, the files stored locally at the client device may be synchronized with the associated interaction data stored remotely in the storage of the voice interaction design system.

The interaction data 124 includes triggers 208 and corresponding actions 210. In this example, the triggers 208 include voice commands 212, user gestures 214 (e.g., taps, drags, swipes, or keystrokes), and time delays 216, and the actions include speech responses 218, page transitions 220, and media output 222. In some cases, the design application 118 provides an interaction interface which enables the user to select the trigger and associated action from a list of defined triggers and actions. Once selected, the user provides input describing the selected trigger and action. For example, to associate a voice command with a particular visual page 122 of the application prototype 120, the voice interaction tool 126 may enable the user to select the particular visual page 122 (e.g., using touch functionality) and specify different voice commands 212 or speech responses 218 that correspond to the particular element via the interaction interface (e.g., by typing the commands or responses, speaking the commands or responses into a microphone or a communicably coupled device, and so on). The voice commands may be configured as audio data or text data indicative of speech of a user to a voice assistant device. The speech response represents the audible output in response to receipt of the voice command, e.g., audible speech. When a voice command 212 is received as voice input from the user via a microphone, the speech-to-text service 128 may be utilized to convert the captured audio into a text string. In one or more implementations, the voice interaction tool 126 may generate multiple variations of the voice command 212. For example, if the voice command 212 is received as "What is the weather tomorrow", the voice interaction tool 126 may generate multiple variations of this voice command such as "what is the weather going to be tomorrow", "is it going to rain tomorrow?", "is it going to be sunny tomorrow", "how hot will it be tomorrow", and so forth.

Figure 3:
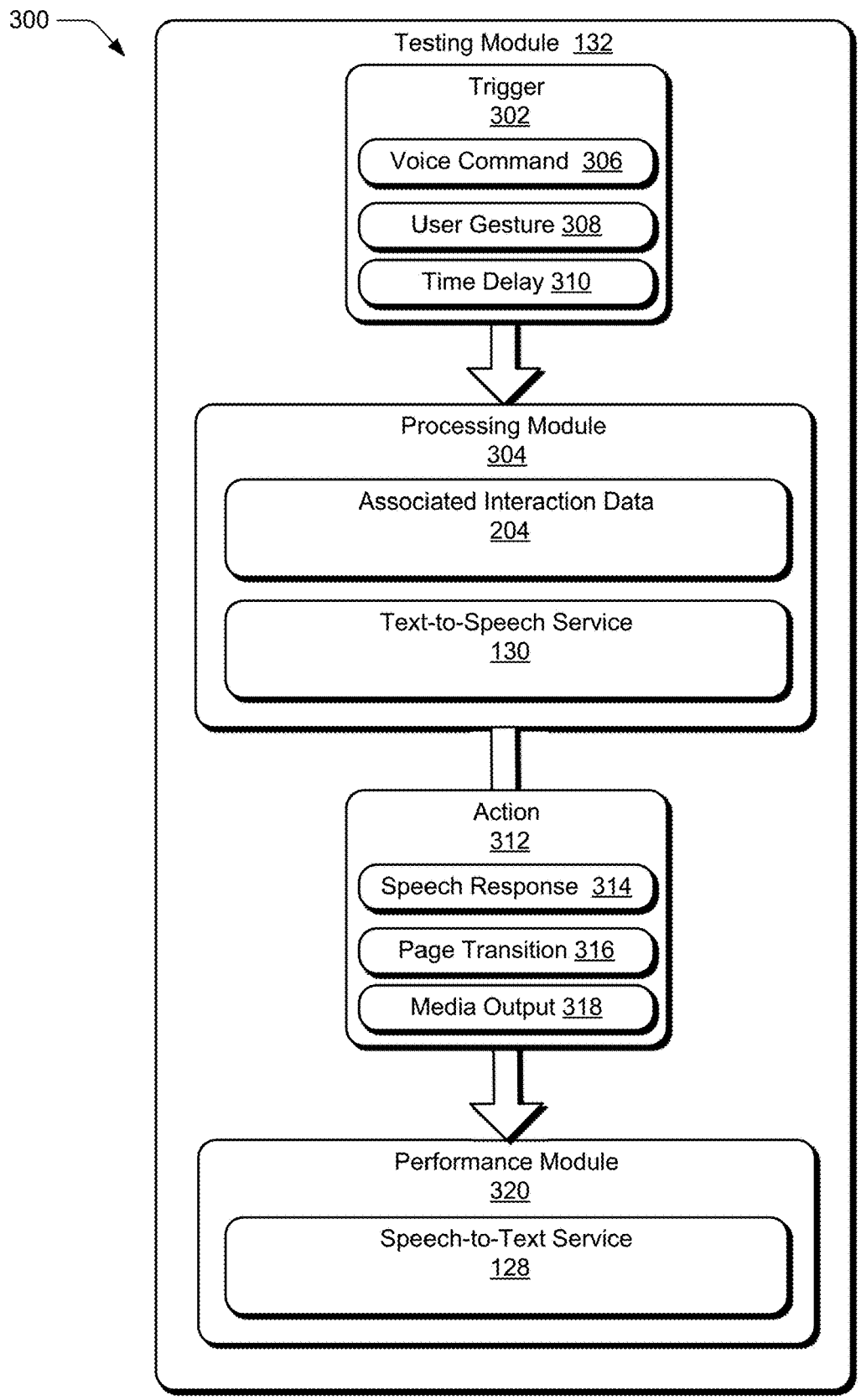
FIG. 3 depicts an example implementation in which the testing module of the design application of FIG. 1 facilitates testing of the application prototype.

The described techniques also enable the user to interact with the application prototype 120 during a testing phase. In this context, consider FIG. 3, which depicts an example implementation 300 in which the testing module of the design application of FIG. 1 facilitates testing of the application prototype. The illustrated example 300 includes from FIG. 1 the testing module 132, the speech-to-text service 128, and the text-to-speech service 130.

In the testing phase, the testing module 132 initiates the display of a first visual page 122 (e.g., a home page) of the application prototype 120. During the display of the first visual page 122, a user interacts with the application prototype 120, such as by speaking a voice command or tapping on the visual page 122, and the testing module 132 obtains a trigger 302 based on the user interaction in real-time. The testing module 132 is illustrated as including a processing module 304, which represents functionality to process the user interactions to identify the trigger 302, such as a voice command 306, a user gesture 308, or a time delay 310.

The processing module 304 compares the identified trigger 302 to the associated interaction data 204 to identify a matching trigger. For example, the request processing module 304 compares the voice command 306 or user gesture 308 to the stored voice commands 212 and user gestures 214, respectively, of the associated interaction data 204. To identify the matching trigger, the processing module 304 may leverage a variety of techniques such as unique identifiers, hashes, text-based searches, and so forth. Additionally, the processing module 304 may continuously monitor for time delay triggers when a new visual page is displayed.

When the trigger 302 is received as a voice command 306, the processing module 304 provides the audio data of the voice command 306 to the speech-to-text service 128. The speech-to-text service 128 processes the audio data, in real-time, to convert the audio data of the voice command 306 into a text string. The processing module 304 obtains the text string of the voice command 306 from the speech-to-text service 128 and compares the text string of the voice command 306 to the stored text strings of voice commands 212 to identify a matching voice command.

The processing module 304 may identify a matching voice command by comparing the letters of the text string of the received voice command 306 to letters of the text strings of the stored voice commands 212. A higher number of matching letters indicates a higher probability of a match. For example, if the command includes the word "mouse", then the processing module 304 may recognize the word "house" as matching "mouse" because the words have four matching characters. In some cases, the speech-to-text service 128 includes a confidence score with the text string which indicates a level of confidence that the text string is correct. The confidence score assists the processing module 304 with identifying a matching voice command. In one or more implementations, the processing module 304 is configured to select the matching text string using a low tolerance to enable the user to more easily interact with the application prototype.

In response to detecting that the trigger 302 matches a stored trigger 208 of the associated interaction data 204, the processing module 304 identifies the corresponding action 210 that is associated with the trigger in the associated interaction data 204. An action 312, corresponding to a speech response 314, a page transition 316, or media output 318, is then passed to a performance module 320. The performance module 320 causes the corresponding action 312 associated with the identified trigger to be performed, such as by outputting the speech response 314, performing a page transition 316 to a different visual page, outputting audio or video content, or some combination thereof.

When the action 312 corresponds to a speech response 314, the performance module may provide the text string of the speech response 314 to the text-to-speech service 130 in real-time. The text-to-speech service 130 converts the text string of the speech response 314 into audio data corresponding to the speech response 314. The performance module 320 then causes output of the audio data corresponding to the speech response 314.

In this way, the described system enables the user to interact with the application prototype 120 during the testing phase to ensure that the application prototype 120 will function as intended. Doing so enables the user to identify and improve any problems with the design of voice-assisted application prototype 120 before the development stage.

Figure 4B:
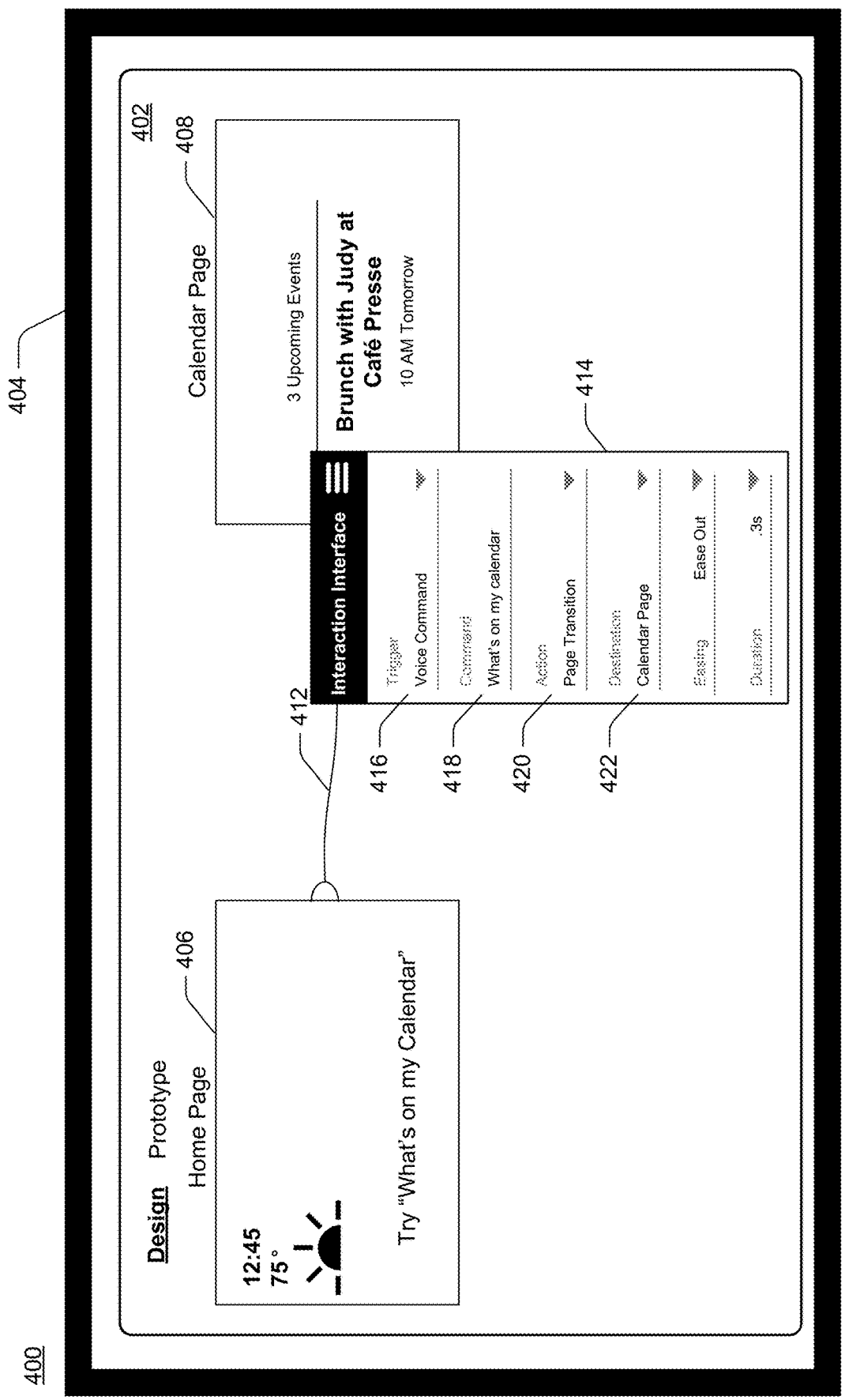
Figure 4C:
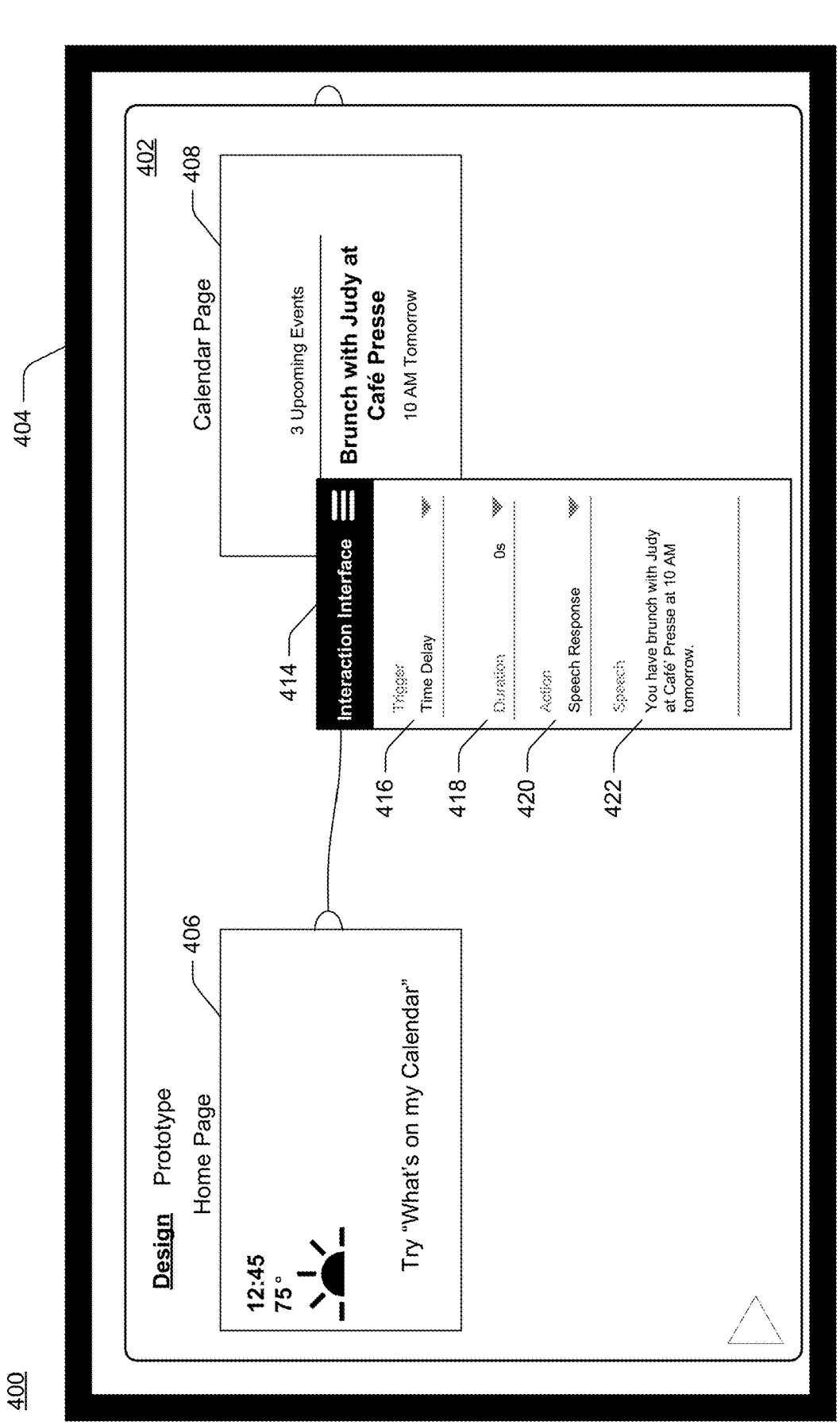

FIGS. 4A-4C depict an example 400 of a design user interface of a design application used to design a voice-assisted application prototype.

In FIG. 4A, a design interface 402 of the design application 118 is displayed via a display device 404. The design interface 402 is depicted as including a first visual page 406 and a second visual page 408. The first visual page 406 and the second visual page 408 may been designed by a user utilizing the design application 118 or imported from a different design application. Notably, the design interface 402 may be utilized by the user to generate any number of different visual pages.

The illustrated example 400 also includes a cursor 410, which represents functionality to enable a user to provide input to interact with various controls and functionalities of the design interface 402 provided by the design application 118. Although the cursor 410 is illustrated, in one or more implementations there may be no displayed cursor. In some cases, the various controls and functionalities of the design interface 402 may be selected or interacted with in other ways, such as via touch input (or other gesture input), keyboard input, stylus input, voice input, and so forth.

The visual pages 406 and 408 represent visual pages or screens of the application prototype 120, which are often referred to by designers as "art boards". In this example, first visual page 406 corresponds to a "home page" of the application prototype 120, and includes text indicating a current time, a current temperature, and a graphic depicting the current weather as "sunny".

The second visual page 408, in this example, corresponds to a calendar page of the application prototype 120, and includes text indicating that the user has 3 upcoming events, and that the user has an appointment corresponding to "Brunch with Judy at Café' Presse, at 10 AM tomorrow". Notably, the first visual page 406 includes text indicating that the user may speak a voice command "What's on my calendar". This text provides a visual clue to the user that the user can transition to a calendar page by speaking the voice command.

In order to enable the transition to the calendar page based on this voice command, the design interface enables the user to link the first visual page 406 to the second visual page 408. In this example, the user links the visual pages 406 and 408 by selecting a handle control on the first visual page 406 using the cursor 410 and dragging the cursor to the second visual page 408. Doing so causes the design interface to generate a visual linking element 412 between the first visual page 406 and the second visual page 408.

In response to linking the first visual page 406 to the second visual page 408, the design interface enables the user to provide input identifying a trigger for this transition, which is illustrated in FIG. 4B. In FIG. 4B, the design application presents an interaction interface 414 that includes controls for providing a trigger and an associated action for a visual page of the application prototype. In this example, the interaction interface 414 includes a trigger control 416 to receive input defining a type of the trigger. In some cases, the trigger control 416 of the interaction interface 414 enables the user to select the type of trigger from a list of defined triggers, such as by selecting the down arrow proximate the trigger control 416 to cause presentation of a list of triggers. As described throughout, the list of pre-defined triggers displayed in the interaction interface 414 may include a voice command, a user gesture, or a time delay, to name just a few. In this example, the user has provided input to select the voice command as the trigger.

Responsive to selection of the voice command as the trigger, the interaction interface 414 may be modified to provide a trigger content control 418. In FIG. 4B, for example, the interaction interface 414 displays a trigger content control 418 as a command prompt configured to receive input defining the words of the voice command. Alternately, if the trigger is selected as a user gesture of a time delay, the trigger content control 418 may be modified to receive input describing the type of user gesture or a duration of the time delay, respectively.

The user, in this instance, has provided input defining the voice command as "what's on my calendar". This user input can be received as textual input to trigger content control 418. In other words, the user can type the words of the voice command directly into the trigger content control 418 of the interaction interface 414. Alternately, the user may speak the words of the voice command into a microphone or communicably coupled device, which causes the spoken words to be converted into textual input, as described throughout. If the voice command is spoken by the user, the interaction interface 414 may display the converted text in the interaction interface 414 to enable the user to confirm that the text is recognized correctly, and to make changes as needed.

The interaction interface 414 is further depicted as including an action control 420 and associated action content control 422. The action control 420 is configured to receive input defining a type of the action to be performed in response to detection of the corresponding trigger. In some cases, the action control 420 of the interaction interface 414 enables the user to select the type of action from a list of defined actions, such as by clicking the down arrow proximate the action control 420 to cause presentation of a list of actions. As described throughout, the actions may include a speech response, a page transition, or output content, to name just a few. In this example, the user has provided input to select a page transition as the action for the corresponding voice command trigger. Alternately, the page transition action may be automatically selected for the user based on the input to associate the first visual page 406 with the second visual page 408.

Responsive to selection of the page transition as the action, the interaction interface 414 may be modified to provide an action content control 422. In FIG. 4B, for example, the interaction interface 414 displays an action content control 422 as a command prompt configured to receive input defining the destination of the page transition. Alternately, if the action is selected as a speech response or content output, the action content control 422 may be modified to receive input describing the words of the speech response or defining the content to be output (e.g., a filename of a video file) respectively.

The user, in this instance, has provided input defining the page transition to transition to the calendar page of the application prototype. Again, in some cases, the location of the page transition may be automatically selected for the user based on the input to link the first visual page to the second visual page. In this example, the design interface enables the user to further define characteristics of the page transition, such as easing, a transition effect, or a duration of the page transition.

Notably, in FIG. 4B, the trigger and associated action defined via input to the interaction interface 414 is associated with the first visual page 406 and the second visual page. The design interface may also enable the user to define a trigger and corresponding action associated with a single visual page, such that an action is performed in response to the trigger without transitioning to a different visual page.

In this context, consider FIG. 4C. In FIG. 4C, the design application presents an interaction interface 414 that includes controls for providing a trigger and an associated action for a visual page of the application prototype. In this example, the interaction interface 414 is dynamically presented in response to user input to the second visual page 408 corresponding to the calendar page. Rather than selecting a voice command, in this instance the user selects a time delay trigger via the trigger control 416, and then provides input, via the trigger content control 418, to define the duration of the time delay to be 0 seconds. The user has also provided input to select a speech response, via the action control 420, and then provides input, via the action content control 422, defining the words of the speech response action. The input defining the speech response can be received as textual input to action content control 422. In other words, the user can type the words of the speech response directly into the action content control 422 of the interaction interface 414. Alternately, the user may speak the words of the speech response into a microphone or communicably coupled device, which causes the spoken words to be converted into textual input, as described throughout. If the speech response is spoken by the user, the interaction interface 414 may display the converted text in the action content control 422 of the interaction interface 414 to enable the user to confirm that the text is recognized correctly, and to make changes as needed.

Notably, the interaction interface 414 enables the user to associate various different types of triggers and actions with visual pages of the application prototype. For example, the designer can associate voice command triggers with corresponding speech responses. However, the designer can also mix and match voice interactions with other triggers and actions, such as by associating a user gesture trigger with a speech response, or by associating a voice command with a transition to a different visual page of the application prototype.

Figure 5B:
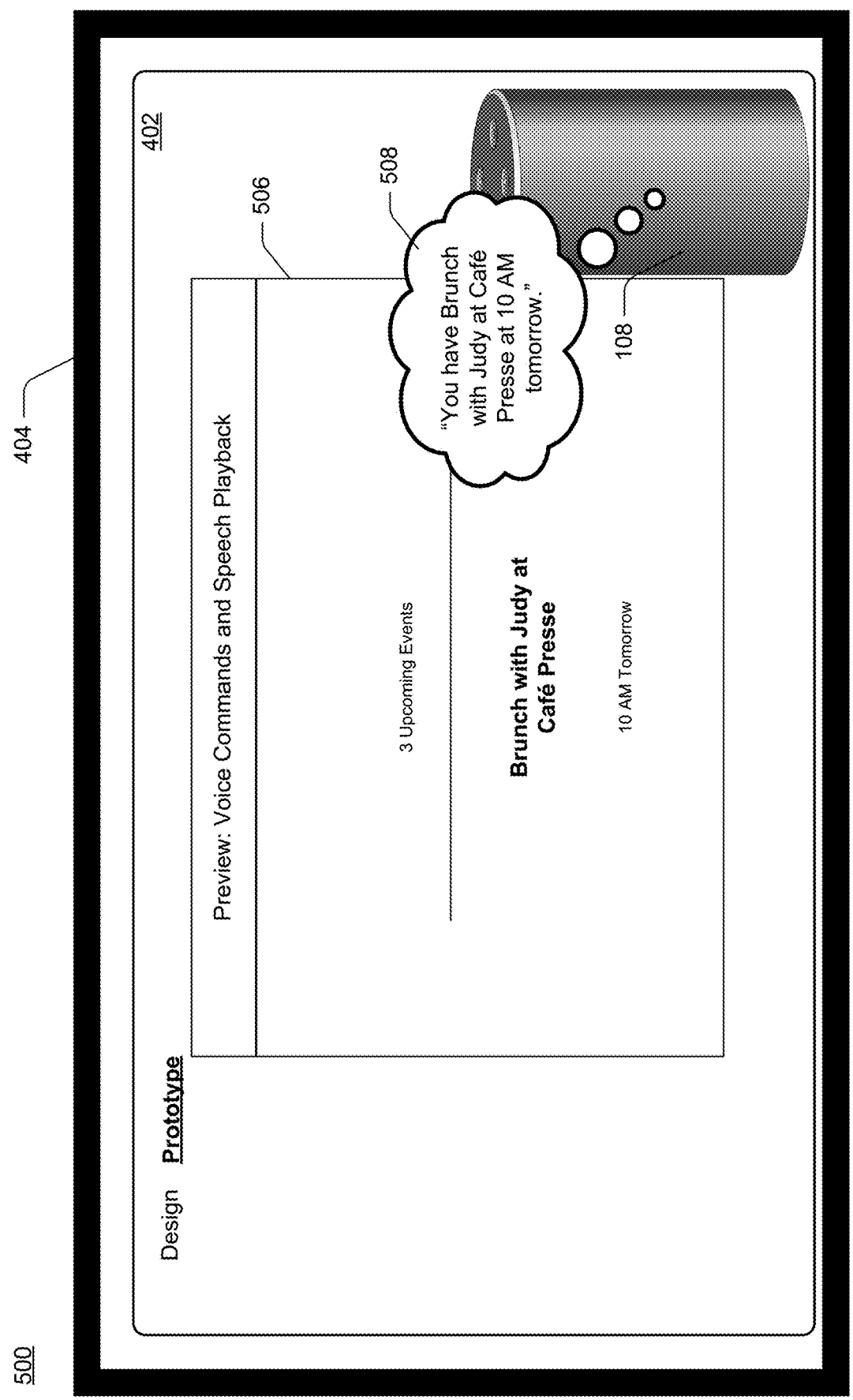

FIGS. 5A and 5B depict an example 500 of a design user interface of a design application during a testing phase of a voice-assisted application prototype. Once the user has designed the visual pages and user interactions of the application prototype as depicted in FIGS. 4A-4C, a testing phase can be initiated via selection of a testing control of the design interface. In example 500, the testing module 132 of the design application 118 displays a first visual page 502 of the application prototype on the display device 404. Notably, the first visual page 502 corresponds to the first visual page 406 depicted in FIGS. 4A-4C. In the testing phase, rather than displaying a layout of visual pages and associated triggers and actions, the testing module 132 controls the designed application prototype 120 to function like an executable application.

In real-time, as the user interacts with the application prototype in the testing phase, such as by speaking a voice command or tapping on the visual page, the testing module 132 causes the corresponding actions associated with the triggers to be performed, such as by outputting audible content, outputting visual content, transitioning to a different visual page, or some combination thereof. In FIG. 5A, for example, the user speaks a voice command 504 which includes the words "what's on my calendar?". A microphone detects the spoken voice command and the speech-to-text service 128 converts the audio data into a text string containing the words "what's on my calendar". This text string is then compared to the associated interaction data provided by the user during the design of the application prototype.

In this instance, the testing module 132 recognizes the text string of the voice command 504 as matching the voice command provided to the trigger content control 418 of the interaction interface 414 in FIG. 4B. Based on detecting a match, the testing module 132 causes performance of the corresponding action previously entered by the user into the controls 420 and 422 of the interaction interface 414 of FIG. 4B. In this case, the corresponding action is detected as a page transition to the calendar page (e.g., visual page 408 of FIG. 4).

FIG. 5B depicts the display of a second visual page 506 corresponding to the calendar page after the testing module 132 transitions from the first visual page 502 to the second visual page 506 based on the action associated with the detected trigger. Additionally, as the calendar page includes a time delay trigger of 0 seconds with a corresponding speech response, the testing module 132 application causes a speaker or associated device to audibly output the speech response 508, which in this example corresponds to the words "You have brunch with Judy at Café' Presse at 10 AM tomorrow". To do so, a text string containing the words of the speech response is passed to the text-to-speech service 130. The text-to-speech service 130 then converts the text string of the speech response into an audio file, which is then output in real-time at the computing device. In this way, the described system enables the user to interact with the application prototype during the testing phase to ensure that the application prototype will function as intended.

Having discussed example details of the techniques for a voice interaction development tool, consider now some example procedures to illustrate additional aspects of the techniques.

Example Procedures

This section describes example procedures for designing and testing voice-assisted application prototypes in one or more implementations. Aspects of the procedures may be implemented in hardware, firmware, or software, or a combination thereof. The procedures are shown as a set of blocks that specify operations performed by one or more devices and are not necessarily limited to the orders shown for performing the operations by the respective blocks.

Figure 6:
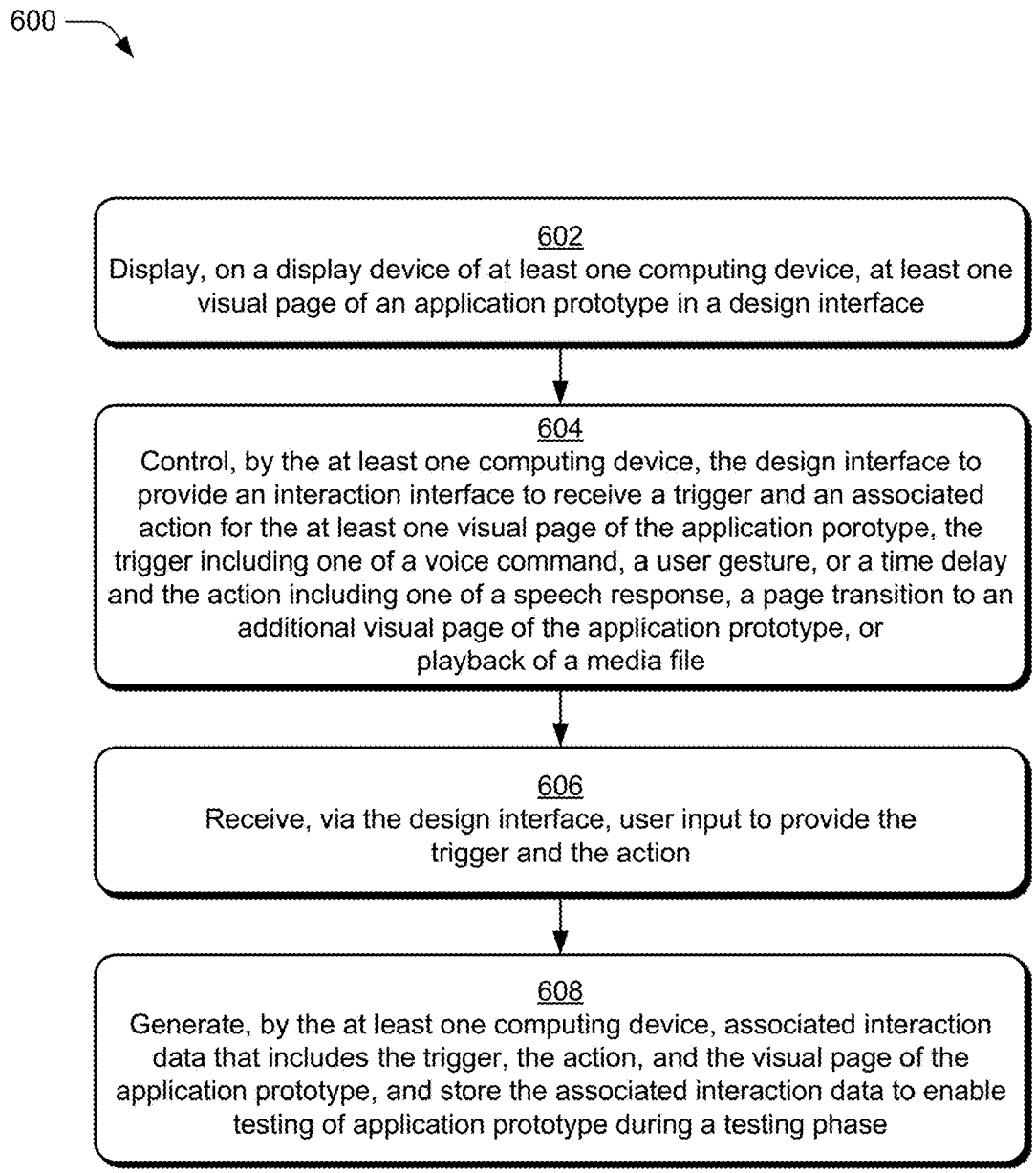
FIG. 6 depicts an example procedure 600 in which a voice-assisted application prototype is designed.

FIG. 6 depicts an example procedure 600 in which a voice-assisted application prototype is designed.

At least one visual page of an application prototype is displayed in a design interface on a display of a computing device (block 602). By way of example, a design application 118 displays a visual page 122 of an application prototype 120 in a design interface 402 on the display of computing device 102.

The design interface is controlled to provide an interaction interface to receive a trigger and an associated action for the at least one visual page of the application prototype (block 604). In accordance with the principles discussed herein, the trigger corresponds to one of a voice command, a user gesture, or a time delay and the action corresponds to one of a speech response, a transition to an additional visual page of the application prototype, or playback of a media file. By way of example, the voice interaction tool 126 controls the design interface 402 to provide an interaction interface 414 to receive a trigger 208 and an associated action 210 for the at least one visual page 122 of the application prototype 120.

User input is received, via the interaction interface, to provide the trigger and the action (block 606). By way of example, the voice interaction tool 126 receives user input 202 via the design interface 402 to provide the trigger 208 and the action 210.

Associated interaction data is generated that includes the trigger, the action, and the visual page of the application prototype, and the associated interaction data is stored to enable testing of the application prototype during a testing phase (block 608). By way of example, the voice interaction tool 126 stores the trigger 208 and the action 210 with an indication of the visual page 122 as associated interaction data 204 in a storage 206 such that detection of the trigger during a testing phase causes performance of the action.

Figure 7:
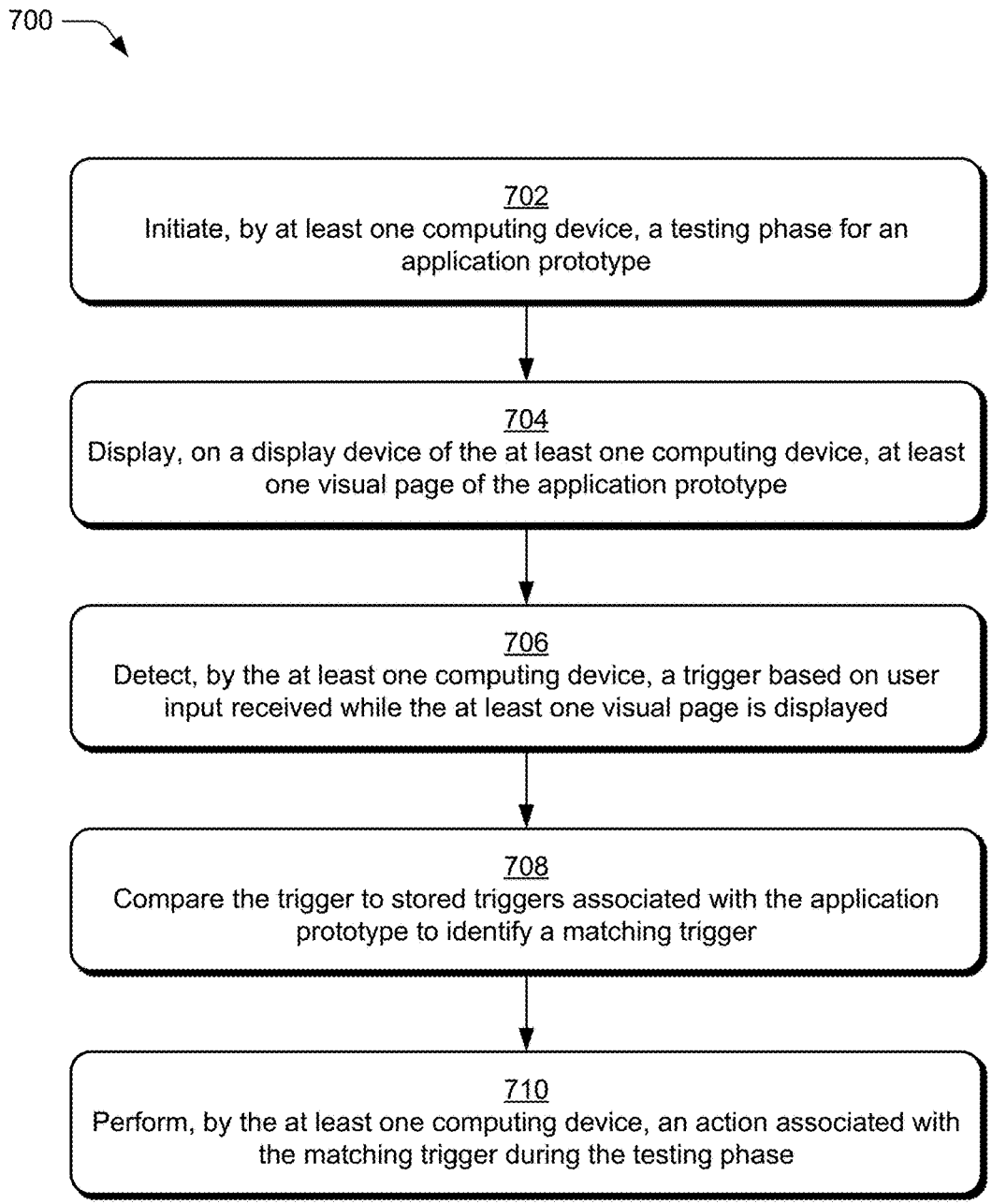
FIG. 7 depicts an example procedure 700 in which a voice-assisted application prototype is tested.

FIG. 7 depicts an example procedure 700 in which a voice-assisted application prototype is tested.

A testing phase is initiated for an application prototype (block 702), and at least one visual page of the application protype is displayed in the testing phase (block 704). By way of example, the testing module 132 initiates the testing phase for the application prototype 120 and displays at least one visual page 122 for the application prototype 120 during the testing phase.

A trigger is detected based on user input received while the at least one visual page is displayed (block 706). The trigger may correspond to a voice command, a user gesture, a time delay, to name just a few. By way of example, during the display of the first visual page 122, in real-time, a user interacts with the application prototype 120, such as by speaking a voice command or tapping on the visual page 122, and the testing module 132 obtains a trigger 302 based on the user interaction. A processing module 304 of the testing module 132 processes the user input to identify the trigger 302, such as a voice command 306, a user gesture 308, or a time delay 310.

The trigger is compared to stored triggers associated with the application prototype to identify a matching trigger (block 708). By way of example, the processing module 304 compares the identified trigger 302 to the associated interaction data 204 to identify a matching trigger. For example, the request processing module 304 compares the voice command 306 or user gesture 308 to the stored voice commands 212 and user gestures 214, respectively, of the associated interaction data 204. To identify the matching trigger, the processing module 304 may leverage a variety of techniques such as unique identifiers, hashes, text-based searches, and so forth. Additionally, the processing module 304 may continuously monitor for time delay triggers when a new visual page is displayed.

When the trigger 302 is received as a voice command 306, the processing module 304 provides the audio data of the voice command 306 to the speech-to-text service 128. The speech-to-text service 128 processes the audio data, in real-time, to convert the audio data of the voice command 306 into a text string. The processing module 304 obtains the text string of the voice command 306 from the speech-to-text service 128 and compares the text string of the voice command 306 to the stored text strings of voice commands 212 to identify a matching voice command.

The processing module 304 may identify a matching voice command by comparing the letters of the text string of the received voice command 306 to letters of the text strings of the stored voice commands 212. A higher number of matching letters indicates a higher probability of a match. For example, if the command includes the word "mouse", then the processing module 304 may recognize the word "house" as matching "mouse" because the words have four matching characters. In some cases, the speech-to-text service 128 includes a confidence score with the text string which indicates a level of confidence that the text string is correct. The confidence score assists the processing module 304 with identifying a matching voice command. In one or more implementations, the processing module 304 is configured to select the matching text string using a low tolerance to enable the user to more easily interact with the application prototype.

Responsive to identifying the matching trigger, an action associated with the matching trigger is performed during the testing phase (block 710). In accordance with the principles discussed herein, the action may correspond to a speech response, a page transition to a different visual page, or playback of a media file. By way of example, in response to detecting that the trigger 302 matches a stored trigger 208 of the associated interaction data 204, the processing module 304 identifies the corresponding action 210 that is associated with the trigger in the associated interaction data 204. An action 312, corresponding to a speech response 314, a page transition 316, or media output 318, is then passed to a performance module 320. The performance module 320 causes the corresponding action 312 associated with the identified trigger to be performed, such as by outputting the speech response 314, performing a page transition 316 to a different visual page, outputting audio or video content, or some combination thereof.

When the action 312 corresponds to a speech response 314, the performance module may provide the text string of the speech response 314 to the text-to-speech service 130 in real-time. The text-to-speech service 130 converts the text string of the speech response 314 into audio data corresponding to the speech response 314. The performance module 320 then causes output of the audio data corresponding to the speech response 314.

Having described example procedures in accordance with one or more implementations, consider now an example system and device that can be utilized to implement the various techniques described herein.

Example System and Device

Figure 8:
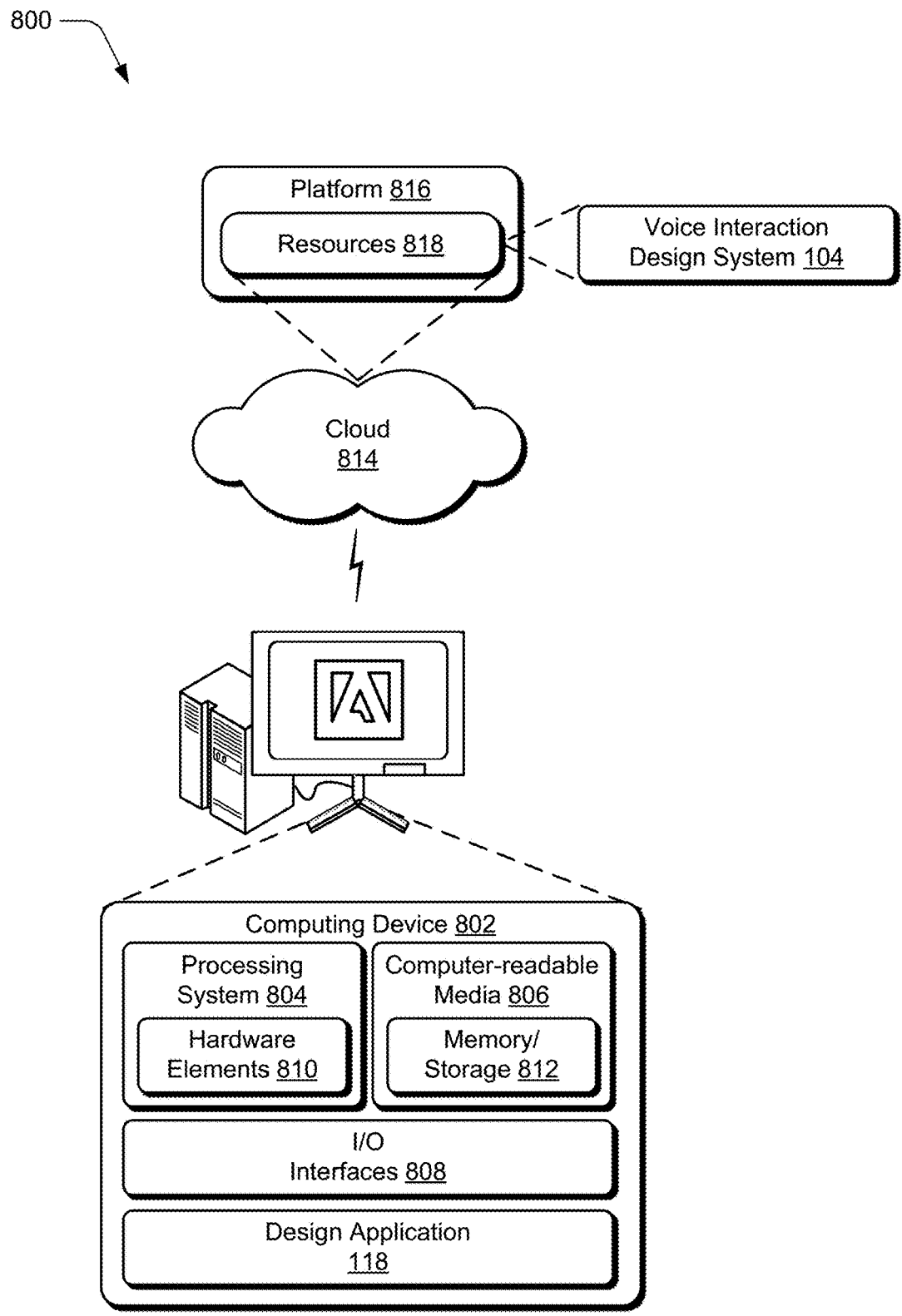
FIG. 8 illustrates an example system including various components of an example device that can be implemented as any type of computing device as described and/or utilized with reference to FIGS. 1-7 to implement embodiments of the techniques described herein.

FIG. 8 illustrates an example system generally at 800 that includes an example computing device 802 that is representative of one or more computing systems and/or devices that may implement the various techniques described herein. This is illustrated through inclusion of the design application 118 and the voice interaction design system 104. The computing device 802 may be, for example, a server of a service provider, a device associated with a client (e.g., a client device), an on-chip system, and/or any other suitable computing device or computing system.

The example computing device 802 as illustrated includes a processing system 804, one or more computer-readable media 806, and one or more I/O interfaces 808 that are communicatively coupled, one to another. Although not shown, the computing device 802 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 804 is representative of functionality to perform one or more operations using hardware. Accordingly, the processing system 804 is illustrated as including hardware elements 810 that may be configured as processors, functional blocks, and so forth. This may include implementation in hardware as an application specific integrated circuit or other logic device formed using one or more semiconductors. The hardware elements 810 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 806 is illustrated as including memory/storage 812. The memory/storage 812 represents memory/storage capacity associated with one or more computer-readable media. The memory/storage component 812 may include volatile media (such as random access memory (RAM)) and/or nonvolatile media (such as read only memory (ROM), Flash memory, optical disks, magnetic disks, and so forth). The memory/storage component 812 may include fixed media (e.g., RAM, ROM, a fixed hard drive, and so on) as well as removable media (e.g., Flash memory, a removable hard drive, an optical disc, and so forth). The computer-readable media 806 may be configured in a variety of other ways as further described below.

Input/output interface(s) 808 are representative of functionality to allow a user to enter commands and information to computing device 802, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 802 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 802. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 802, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 810 and computer-readable media 806 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 810. The computing device 802 may be configured to implement particular instructions and/or functions corresponding to the software and/or hardware modules. Accordingly, implementation of a module that is executable by the computing device 802 as software may be achieved at least partially in hardware, e.g., through use of computer-readable storage media and/or hardware elements 810 of the processing system 804. The instructions and/or functions may be executable/operable by one or more articles of manufacture (for example, one or more computing devices 802 and/or processing systems 804) to implement techniques, modules, and examples described herein.

The techniques described herein may be supported by various configurations of the computing device 802 and are not limited to the specific examples of the techniques described herein. This functionality may also be implemented all or in part through use of a distributed system, such as over a "cloud" 814 via a platform 816 as described below.

The cloud 814 includes and/or is representative of a platform 816 for resources 818. The platform 816 abstracts underlying functionality of hardware (e.g., servers) and software resources of the cloud 814. The resources 818 may include applications and/or data that can be utilized while computer processing is executed on servers that are remote from the computing device 802. Resources 818 can also include services provided over the Internet and/or through a subscriber network, such as a cellular or Wi-Fi network.

The platform 8916 may abstract resources and functions to connect the computing device 802 with other computing devices. The platform 816 may also serve to abstract scaling of resources to provide a corresponding level of scale to encountered demand for the resources 818 that are implemented via the platform 816. Accordingly, in an interconnected device embodiment, implementation of functionality described herein may be distributed throughout the system 800. For example, the functionality may be implemented in part on the computing device 802 as well as via the platform 816 that abstracts the functionality of the cloud 814.

Conclusion

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment to aid design of an application prototype with voice functionality, a method implemented by at least one computing device, the method comprising:
　　displaying, on a display device of the at least one computing device, at least one visual page of the application prototype with voice functionality in a design interface;
　　controlling, by the at least one computing device, the design interface to provide an interaction interface to receive a trigger and an associated action for the at least one visual page of the application prototype with voice functionality;

receiving, via the design interface, user input to provide the trigger and the action and to select a trigger type of the trigger and an action type of the action from a selectable list of trigger types and action types presented within the interaction interface, the selectable list including trigger types comprising at least a voice command and a user gesture and action types comprising at least a speech response and a page transition; and generating, by the at least one computing device, associated interaction data comprising the trigger, the action, and the visual page of the application prototype.

2. The method as described in claim 1, wherein the interaction interface is displayed in response to receiving linking input to link the visual page to the additional visual page.

3. The method as described in claim 1, wherein the selectable list of action types further comprises playback of a media file.

4. The method as described in claim 1, further comprising generating a design specification comprising instructions to develop the application based on the application prototype, the design specification including visual pages of the application prototype, triggers provided via the design interface, and associated actions provided via the design interface.

5. The method as described in claim 1, further comprising generating an executable application based on the application prototype designed using the design application.

6. The method as described in claim 1, wherein the trigger type comprises the voice command and the action type comprises the speech response.

7. A method as described in claim 1, further comprising storing the associated interaction data to enable testing of the application prototype during a testing phase.

8. A method as described in claim 7, wherein the selected action type comprises the speech response, and wherein the method further comprises:
   initiating, by the at least one computing device, the testing phase for the application prototype;
   in the testing phase, displaying the at least one visual page of the application prototype;
   detecting, by the at least one computing device, an additional trigger;
   comparing the additional trigger to stored triggers of the associated interaction data to identify a matching trigger;
   determining that the matching trigger is associated with the speech response in the associated interaction data;
   providing, in real time, a text string of the speech response to a text-to-voice service;
   receiving, from the text-to-voice service, an audio file of the speech response; and
   outputting the speech response by playing back the audio file.

9. A method as described in claim 7, wherein the selected trigger type comprises the voice command.

10. A method as described in claim 9, wherein the receiving the user input to provide the trigger further comprises:
   capturing, by at least one microphone of the at least one computing device, the voice command;
   providing the captured voice command to a voice-to-text service;
   obtaining a text string of the voice command from the voice-to-text service; and
   associating the text string of the voice command with the action.

11. A method as described in claim 9, further comprising:
   initiating, by the at least one computing device, the testing phase for the application prototype;
   in the testing phase, displaying the at least one visual page of the application prototype;
   capturing, by the at least one microphone of the at least one computing device, an additional voice command;
   providing, in real time, the additional voice command to a voice-to-text service;
   receiving an additional text string of the additional voice command from the voice-to-text service;
   comparing the additional text string of the additional voice command to stored text strings of voice commands of the associated interaction data to identify a matching voice command; and
   performing the action associated with the matching voice command in the associated interaction data.

12. A system comprising:
   at least one microphone;
   at least one processor; and
   a memory having stored thereon computer-readable instructions that are executable by the at least one processor to perform operations including:
      controlling a design interface to provide an interaction interface to receive a voice command and an associated action for at least one visual page of an application prototype with voice functionality;
      receiving, via the design interface, user input to provide the voice command and the associated action and to select an action type of the action from a selectable list of action types presented within the interaction interface, the selectable list of action types comprising at least a speech response and a page transition;
      initiating a testing phase for the application prototype with voice functionality;
      in the testing phase, displaying the at least one visual page of the application prototype;
      capturing, by the at least one microphone, a voice command;
      providing, in real time, the captured voice command to a voice-to-text service;
      receiving, from the voice-to-text service, a text string of the captured voice command;
      comparing the text string of the captured voice command to stored text strings of voice commands associated with the application prototype to identify the voice command as matching the captured voice command; and
      performing the action associated with the voice command during the testing phase of the application prototype.

13. A system as described in claim 12, wherein performing the action comprises:
   identifying a page transition associated with the matching voice command, the page transition identifying an additional visual page of the application prototype; and
   displaying the different visual page of the application prototype.

14. A system as described in claim 12, wherein performing the action comprises:
   identifying a media file associated with the matching voice command; and
   initiating playback of the media file.

15. A system as described in claim 12, wherein performing the action comprises outputting a speech response associated with the voice command.

16. A system as described in claim 15, wherein performing the action comprises:

identifying a speech response associated with the matching voice command;

providing a text string of the speech response to a text-to-speech service;

receiving, from the text-to-speech service, an audio file of the speech response; and outputting the speech response by playing back the audio file.

17. In a digital medium environment to enable testing of an application prototype with voice functionality, a method implemented by at least one computing device, the method comprising:

controlling, by the at least one computing device, a design interface to provide an interaction interface to receive a trigger and an associated action for at least one visual page of the application prototype with voice functionality;

receiving, via the design interface, user input to provide the trigger and the action and to select a trigger type of the trigger and an action type of the action from a selectable list of trigger types and action types presented within the interaction interface, the selectable list including trigger types comprising at least a voice command and a user gesture and action types comprising at least a speech response and a page transition;

initiating, by the at least one computing device, a testing phase for the application prototype with voice functionality;

in the testing phase, displaying the at least one visual page of the application prototype;

detecting, by the at least one computing device, user input providing a trigger;

comparing the trigger to stored triggers associated with the application prototype to identify the trigger as matching the detected trigger;

identifying a speech response associated with the trigger matching trigger;

providing, in real time, a text string of the speech response to a text-to-voice service;

receiving, from the text-to-voice service, an audio file of the speech response; and outputting, by the at least one computing device, the speech response by playing back the audio file.

18. A method as described in claim 17, wherein the trigger comprises a voice command that is captured by at least one microphone of the at least one computing device, and wherein the method further comprises:

providing, in real time, the voice command to a voice-to-text service;

receiving, from the voice-to-text service, a text string of the voice command;

comparing the text string of the voice command to stored text strings of voice commands associated with the application prototype to identify a matching voice command; and wherein the identifying the speech response comprises identifying the speech response associated with the matching voice command.

19. A method as described in claim 17, wherein the trigger comprises a user gesture.

20. A method as described in claim 17, wherein the trigger comprises a time delay, and wherein the outputting the speech response by playing back the audio file occurs after the time delay expires.

* * * * *

UNITED STATES PATENT AND TRADEMARK OFFICE
CERTIFICATE OF CORRECTION

PATENT NO. : 10,964,322 B2
APPLICATION NO. : 16/255481
DATED : March 30, 2021
INVENTOR(S) : Mark C. Webster et al.

Page 1 of 1

It is certified that error appears in the above-identified patent and that said Letters Patent is hereby corrected as shown below:

Column 22, Line 5, delete "matching trigger", therefor.

Signed and Sealed this
First Day of June, 2021

Drew Hirshfeld
*Performing the Functions and Duties of the*
*Under Secretary of Commerce for Intellectual Property and*
*Director of the United States Patent and Trademark Office*